United States Patent [19]

Kalchauer et al.

[11] Patent Number: 5,098,747
[45] Date of Patent: Mar. 24, 1992

[54] COATING COMPOSITIONS CONTAINING (POLY)BOROSILOXANES AND A PROCESS FOR PREPARING VITREOUS COATINGS

[75] Inventors: Wilfried Kalchauer; Werner Graf; Bernd Pachaly, all of Burghausen, Fed. Rep. of Germany

[73] Assignee: Wacker-Chemie GmbH, Munich, Fed. Rep. of Germany

[21] Appl. No.: 534,994

[22] Filed: Jun. 8, 1990

[30] Foreign Application Priority Data

Jun. 16, 1989 [DE] Fed. Rep. of Germany ....... 3919786

[51] Int. Cl.$^5$ ............................................ B05D 3/02
[52] U.S. Cl. .................................... 427/387; 427/226; 427/190; 427/376.2; 427/377; 428/429; 524/430; 528/5; 556/402
[58] Field of Search .................. 528/5, 25; 427/226, 427/387, 376.1, 376.2, 193, 190; 428/427, 429; 524/430; 264/60; 556/402

[56] References Cited

U.S. PATENT DOCUMENTS

| | | | |
|---|---|---|---|
| 2,517,945 | 8/1950 | Upson | 556/402 |
| 4,152,509 | 5/1979 | Yajima et al. | 528/25 |
| 4,228,270 | 10/1980 | Kobayashi | 528/5 |
| 4,248,814 | 2/1981 | Yajima et al. | 264/63 |
| 4,267,210 | 5/1981 | Yajima et al. | 427/226 |
| 4,347,347 | 8/1982 | Yajima et al. | 528/30 |
| 4,405,687 | 9/1983 | Morita et al. | 528/5 |

*Primary Examiner*—Michael Lusignan
*Assistant Examiner*—Diana L. Dudash

[57] ABSTRACT

The invention related to coating compositions containing (poly)borosiloxanes, which contain at least one other component selected from lead, boron and aluminum compounds and talc, and to a process for preparing vitreous protective coatings, which can be applied to a substrate to be protected and then heat-treated to a temperature of at least 500° C.

13 Claims, No Drawings

COATING COMPOSITIONS CONTAINING (POLY)BOROSILOXANES AND A PROCESS FOR PREPARING VITREOUS COATINGS

The present invention relates to coating compositions and more particularly to coating compositions containing polyborosiloxanes and a process for preparing vitreous coatings and their use as protective coatings.

BACKGROUND OF THE INVENTION

Increasingly greater attention is being paid to the protection of materials such as metals, ceramics and carbonaceous substances which can be employed especially at higher temperatures. Such materials, mainly metals and CFC (carbon fiber-reinforced carbon), are coated with ceramic coatings, for example SiC coatings, especially as protection against oxidation. Because of the very different coefficients of expansion (substrate/ceramic), exposure to heat generally gives rise to microcracks in the protective coating through which substances causing corrosion of the material, such as atmospheric oxygen, acids etc., are able to penetrate. This problem can be partially alleviated by using protective coatings made of glass.

The production of vitreous protective coatings on materials made of metal, ceramics or carbonaceous substances is already known. In British Patent 1,134,756 (Battelle Memorial Institute), a process for the production of a vitreous protective coating is described in which a solution of polyborosiloxanes in an inert solvent is applied to the surface to be protected. After removal of the solvent the coating is subjected to heat treatment. This process has the disadvantage that it is always necessary to use a solvent and the resultant glass coatings do not have adequate mechanical stability and low resistance to changes in temperature. German Patent 2,930,557 (Yajima, Seihi; The Research Institute for Special Inorganic Materials) and the corresponding U.S. Pat. Nos. 4,267,210 and 4,267,211 describe a coating composition which is resistant to corrosion, heat and oxidation, in which the composition consists of an organoborosiloxane compound which has been modified with aliphatic and aromatic alcohols, phenols and aromatic carboxylic acids or with transition metals, metals of the actinium group, metals of the lanthanum group, alloys of these metals, persulfate salts, organic peroxides and halides of Al, Fe, B, Ga and In. The modified organoborosiloxane compound, must be prepared in an atmosphere which is inert or non-oxidizing to the reaction, at a high temperature, then dissolved in an organic solvent, and applied to the substrate to be protected and then heat-treated.

It is an object of the present invention to provide vitreous coating compositions. Another object of the present invention is to provide a process for preparing vitreous coatings having high flexibility. A further object of the present invention is to provide vitreous coatings which are highly flexible, have high stability to chemical and physical influences, are highly resistant to changes in temperature, and exhibit good adhesion to substrates as well as provide good sealing of the substrates.

SUMMARY OF THE INVENTION

The foregoing objects and others which will become apparent from the following description are accomplished in accordance with this invention, generally speaking, by providing coating compositions containing polyborosiloxanes, which compositions contain, in addition to the polyborosiloxane (A)

(B) 0 to 90 percent by weight of a lead compound, selected from the group consisting of lead oxides and lead compounds which form lead oxides at temperatures up to 1500° C. in the presence of atmospheric oxygen, (C) 0 to 90 percent by weight of a boron compound, selected from the group consisting of boron oxides and boron compounds which form boron oxides at temperatures up to 1500° C. in the presence of atmospheric oxygen, with the exception of polyborosiloxane, (D) 0 to 50 percent by weight of talc, (E) 0 to 90 percent weight of an aluminum compound, selected from the group consisting of aluminum oxides and aluminum compounds which form aluminum oxides at temperatures up to 1500° C. in the presence of atmospheric oxygen, and (F) 0 to 600 percent by weight of a solvent, based on the weight of the polyborosiloxane (A) employed, with the proviso that the coating compositions contain at least one of the components (B), (C), (D) and (E) in an amount such that the total weight is at least 20 percent, based on the weight of the polyborosiloxane (A) employed.

DESCRIPTION OF THE INVENTION

Processes for preparing the polyborosiloxane (A) used in this invention are known per se. For example, W. Noll, "Chemie and Technologie der Silicone" ["Chemistry and Technology of the Silicones"], Verlag Chemie, Weinheim, 2nd edition, 1986, page 289 ff and U.S. Pat. No. 4,425,387 (W. Graf, Wacker-Chemie GmbH), describe processes for preparing polyborosiloxane (A).

The polyborosiloxane (A) employed in this invention is preferably a reaction product of an organo(poly)siloxane consisting of units of the general formula

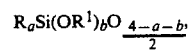

$$R_a Si(OR^1)_b O_{\frac{4-a-b}{2}},$$

in which R represents the same or different substituted hydrocarbon radicals or unsubstituted hydrocarbon radicals and $R^1$ represents the same or different aliphatic hydrocarbon radicals or hydrogen, with the proviso that not more than 5 percent by weight, based on the weight of the organo(poly)siloxane used, of Si-bonded hydroxyl groups are present, a is 0, 1, 2 or 3, b is 0, 1, 2 or 3, with an average of from 0.1 to 2.5, and the sum of a and b is an average of from 1 to 2.8, and at least one boron compound selected from the group consisting of boric acid, boric anhydride, metal borate, boric acid ester and boron halide.

Particularly preferred radicals represented by $R^1$ are hydrocarbon radicals having from 1 to 6 carbon atom(s), and in particular the methyl and the ethyl radical.

Examples of radicals represented by $R^1$ are alkyl radicals such as the methyl, ethyl, n-propyl, isopropyl, 1-n-butyl, 2-n-butyl, isobutyl, tert-butyl, n-pentyl, isopentyl, neopentyl, tert-pentyl and n-hexyl radicals, alkenyl radicals such as the vinyl radical and the allyl radical, cycloalkyl radicals such as the cyclopentyl radical and the cyclohexyl radical, and the phenyl radical.

Particularly preferred radicals represented by R are hydrocarbon radicals having from 1 to 10 carbon atom(s), and in particular the methyl radical.

The examples for hydrocarbon represented by $R^1$ also apply to hydrocarbon radicals represented by R. Further examples of hydrocarbon radicals represented by R are alkyl radicals having from 7 to 10 carbon atoms, such as the n-heptyl, n-octyl, isooctyl, 2,2,4-trimethylpentyl, n-nonyl and n-decyl radicals, cycloalkyl radicals such as the cycloheptyl radical and the methylcyclohexyl radical, alkaryl radicals such as the o-, m- and p-tolyl radicals, the xylyl radical and the ethylphenyl radical, and aralkyl radicals such as the benzyl radical and the α- and β-phenylethyl radicals.

Examples of substituted hydrocarbon radicals represented by R are halogenated hydrocarbon radicals such as the 3,3,3-trifluoropropyl radical and the o-, m- and p-chlorophenyl radicals and radicals containing —COOC— groups, such as the gamma-methacryloxypropyl radical.

However, because of their availability, at least 80% of the number of SiC-bonded organic radicals are preferably methyl radicals.

The organo(poly)siloxanes employed in the preparation of the polyborosiloxanes (A) used in this invention preferably have a viscosity of from 1 to 50 mm²/s, and more preferably from 3 to 30 mm²/s.

These organo(poly)siloxanes are commercial products or are readily available by simple processes, such as described in W. Noll, "Chemistry and Technology of Silicones", Academic Press, Orlando, 1968.

Examples of boron compounds used in the preparation of the polyborosiloxanes (A) employed in this invention are boric acid, boric anhydride and phenylboric acid.

Boric acid and boric anhydride are preferably employed.

In the preparation of the polyborosiloxane (A) used in this invention, the boron compound is preferably employed in amounts of from 0.1 to 30 percent by weight, and more preferably from 3 to 10 percent by weight, based on the weight of the organo(poly)siloxane.

The polyborosiloxane (A) used in this invention is preferably prepared at a temperature of from 0 to 150° C., and more particularly from 50° to 120° C., and at a pressure of from 900 to 1100 hPa.

The polyborosiloxane (A) employed in this invention may consist of a single species of polyborosiloxane. However, it can also be a mixture of at least two different species of such polyborosiloxanes.

The lead compounds (B) employed in this invention are lead oxides, such as PbO and $Pb_3O_4$, and lead compounds which form lead oxides at temperatures up to 1500° C., preferably up to 800° C., in the presence of atmospheric oxygen, such as, for example PbS, $Pb(NO_3)_2$, $Pb(OH)_2$ and $PbCO_3$.

The lead compound (B) employed according to this invention is preferably PbO.

The coating composition of this invention contains lead compound (B) in amounts of from 0 to 90 percent by weight, preferably from 10 to 50 percent by weight and more preferably from 25 to 35 percent by weight, based on the weight of the polyborosiloxane (A) used.

The lead compound (B) employed according to this invention can be a single species of lead compound. However, it can also be a mixture of at least two different species of such lead compounds.

The boron compounds (C) employed according to the invention are boron oxides, such as $B_2O_3$, and boron compounds which form boron oxides at temperatures up to 500° C., and more preferably up to 800° C., in the presence of atmospheric oxygen, except for the polyborosiloxane. Examples of boron compounds are boric acid $B(OH)_3$, kernite $Na_2B_4O_7 \cdot H_2O$, borax $Na_2B_4O_7 \cdot 10H_2O$; borocalcite $CaB_4O_7 \cdot 4H_2O$; boronatrocalcite $NaCaB_5O_9 \cdot 6H_2O$, colemanite $Ca_2B_6O_{11} \cdot 5H_2O$, borazite $2Mg_3B_8O_{15} \cdot MgCl_2$, pandermite $Ca_4B_{10}O_{19} \cdot 7H_2O$ and $Ca_5B_{12}O_{23} \cdot 9H_2O$.

The boron compound (C) employed according to this invention is preferably $B_2O_3$, $B(OH)_3$ and sodium borates, and more preferably kernite, borax and anhydrous sodium tetraborate.

The coating composition of this invention contains boron compound (C) in amounts of from 0 to 90 percent by weight, preferably from 10 to 60 percent by weight and more preferably from 15 to 40 percent by weight, based on the weight of the polyborosiloxane (A) used.

The boron compound (C) employed according to this invention can be a single species of boron compound. However, it can also be a mixture of at least two different species of such boron compounds.

The coating composition of this invention contains talc (D) in an amount of from 0 to 50 percent by weight, preferably from 5 to 35 percent by weight and more preferably from 10 to 30 percent by weight, based on the weight of the polyborosiloxane (A) used.

The aluminum compounds (E) employed according to the invention are aluminum oxides such as $Al_2O_3$, as well as aluminum compounds which form aluminum oxides at temperatures up to 1500° C., and more preferably up to 800° C., in the presence of atmospheric oxygen, such as, for example, AlO(OH), $Al(OH)_3$ and $Al_2(SO_4)_3 \cdot 18H_2O$.

The aluminum compound (E) employed according to this invention is preferably $Al_2O_3$.

The coating composition of this invention contains aluminum compound (E) in an amount of from 0 to 90 percent by weight, preferably from 10 to 60 percent by weight and more preferably from 25 to 40 percent by weight, based on the weight of the polyborosiloxane (A) employed.

The aluminum compound (E) employed according to this invention can be a single species of aluminum compound. However, it can also be a mixture of at least two different species of such aluminum compounds.

The solvent (F) employed according to this invention is preferably a solvent in which the polyborosiloxane (A) is at least partially soluble and more preferably is completely soluble.

Examples of solvents (F) are alcohols such as methanol, ethanol, n-propanol, isopropanol, n-, sec- and tert-butanol and 2-butanol, esters such as methyl acetate, ethyl acetate, n-propyl and isopropyl acetate, n-, sec- and tert-butyl acetate, ethyl formate, n-butyl glycolate and diethyl carbonate, ethers such as dioxane, tetrahydrofuran, diethyl ether, di-n-propyl ether, diisopropyl ether, di-n-butyl ether, ethylene glycol monomethyl ether, ethylene glycol monoethyl ether, diethylene glycol diethyl ether and anisole, chlorinated hydrocarbons such as methylene chloride, trichloromethane, tetrachloromethane, 1,2-dichloroethane, trichloroethylene, tetrachloroethylene and chlorobenzene, hydrocarbons, such as pentane, n-hexane, isomeric mixtures of hexanes, cyclohexane, heptane, octane, benzine, petroleum ether, benzene, toluene, xylenes, ketones such as acetone, methyl ethyl ketone and methyl isobutyl ketone, as well as pyridine and nitrobenzene or mixtures of these solvents.

The solvent (F) employed according to this invention is preferably petroleum ether, toluene, n-butyl glycolate, n-butyl acetate, isopropanol and ethanol.

The coating composition of this invention contains solvent (F) in an amount of from 0 to 600 percent by weight, preferably from 0 to 300 percent by weight and more preferably from 0 to 150 percent by weight, based on the weight of the polyborosiloxane (A) employed.

The coating compositions of this invention contain at least one, preferably at least two and more preferably at least three of the components (B), (C), (D) and (E), in a proportion by weight such that the total is at least 20 percent, preferably at least 25 percent and more preferably at least 30 percent, by weight, based on the weight of the polyborosiloxane (A) employed.

The preparation of the coating composition of this invention from components (A) to (F) may be carried out in any desired manner. Preferably components (B), (C), (D), (E) and, where appropriate (F), are mixed and the mixture is ground to an average particle size of from 0.5 to 10 μm and is then mixed with the polyborosiloxane (A), with the addition of solvent (F) when employed.

In addition to components (A) to (F), the coating composition of this invention may contain additional substances, such as pigments or fillers, for example, sand, quartz powder, aluminum powder and silicon carbide powder.

The coating composition of this invention is preferably employed in the preparation of vitreous coatings.

In the process of this invention for preparing vitreous coatings, the coating composition of this invention is applied to the substrate to be protected and then subjected to a heat treatment.

The substrate to be protected preferably consists of at least one material selected from metals, for example, aluminum, steel, cobalt, nickel, copper, zinc, silver, manganese, chromium and titanium, carbonaceous substances, such as, for example, graphite and CFC (carbon fiber-reinforced carbon), and ceramic materials, such as, for example, $SiO_2$, $Al_2O_3$, BeO, SiC and BN.

The application of the coating composition of this invention onto the substrate to be protected may be carried out in a manner known per se, such as, for example, by brushing, dipping, spraying, rubbing, flowcoating or roller-coating.

If the coating composition contains solvent (F), the coated substrate is dried preferably for 15 minutes to 24 hours at a temperature between 10 and 250° C., depending on the amount and type of the solvent. With respect to the coating composition, drying may be carried out either in an inert atmosphere, such as, for example, in an atmosphere of argon or nitrogen or under vacuum, or in a reactive atmosphere, such as, for example, air or air saturated with water vapour. Drying in the presence of air at a pressure between 900 and 1100 hPa is particularly preferred.

When the coating composition of this invention has been cured by the action of water vapour, the coated substrate is then heat-treated in an inert or reactive atmosphere.

The heat treatment is preferably carried out in the presence of air at a pressure between 900 and 1100 hPa. The temperatures employed may vary depending on the substrate material.

The coated substrate is preferably heated to a temperature between 500° and 1500° C., and more preferably between temperatures of from 600° to 1300° C.

The glass coatings produced by the process of this invention form within a short period of time, so that there is no obvious damage to the substrate by atmospheric oxygen, and are generally free from pores. They preferably have a thickness of from 5 to 500 μm, and more preferably from 20 to 200 μm.

The properties of the glass coatings produced according to this invention can be controlled by adjusting the formulation of the coating composition of this invention to comply with the specific requirements. For example, boron oxide and aluminum oxide reduce the coefficients of expansion of the glass and hence its sensitivity to rapid heating and cooling. Further, lead oxide and sodium oxide, which is formed, for example, by pyrolysis of borax, increase the fusibility of the glass. Numerous possible applications result from the high flexibility of the vitreous coatings prepared according to this invention.

The process of this invention for preparing vitreous coatings can be employed whenever a substrate, which consists of at least one material selected from metals, carbonaceous substances and ceramic materials, is to be protected against chemical and physical influences. It is used, in particular, to produce heat-resistant and chemically resistant protective coatings on metals, ceramics, glass ceramics, fibrous materials and carbon. Protection of CFC (carbon fiber-reinforced carbon) and graphite against oxidation and against mechanical stress, surface-sealing of porous ceramic or fibrous materials, sealing of surfaces of ceramic materials, which are used at temperatures up to about 1200° C., such as, for example, hot gas heat exchangers, and protection of metals such as iron, steel and copper against corrosion, are of particular importance for the coatings of this invention.

Carbonaceous substrates, such as, for example, graphite and CFC (carbon fiber-reinforced carbon) are preferably pretreated by applying a SiC coating. The SiC coating may be applied in a manner known per se, such as, for example, by a process described in German Application P 38 111 567.0 (W. Kalchauer, Wacker-Chemie GmbH). In this process an organopolysilane, which is prepared by reacting a silicon compound which contains Si—Si bonds and at least one radical of the formula —OR, where R is hydrogen or an alkyl radical, with boric acid, is applied to the carbonaceous substrate and is converted in an inert atmosphere at temperatures between 700° and 1500° C. or in a reactive atmosphere at temperatures between 200° and 700° C.

The glass coatings produced by the process of this invention adhere very well to the substrate and display a high resistance to changes in temperature. For example, the glass coatings produced according to this invention are not damaged in a temperature range of from 20° C. to 1000° C. at a temperature change of up to 100° C./s.

Furthermore, the glass coatings produced according to this invention have the advantage that in the event of damage the defective sites may be eliminated by heating to at least 800° C.

In the following examples all parts and percentages are by weight, unless otherwise specified. All viscosity data is at a temperature of 20° C.

EXAMPLE 1

(I) Preparation of polyborosiloxane (A)

About 100 parts of an organo(poly)siloxane are mixed with 3 parts of a boron compound and the mixture is stirred for two hours at the temperature specified in Table 1. A slightly turbid solution forms which is then filtered. More detailed information on the preparation of the polyborosiloxanes 1 to 6 is found in Table 1.

sheet steel,
graphite with a SiC coating prepared by the process described in German Application P 38 111 567.0 (W. Kalchauer, Wacker-Chemie GmbH), and
CFC (carbon fiber-reinforced carbon) with a SiC coating prepared by the process described in German Application P 38 111 567.0 (W. Kalchauer, Wacker-Chemie GmbH), and dried for 20 hours at a temperature of 80° C. in air.

TABLE 1

| No. | Organo(poly)siloxane | Boron compound | Reaction temperature | Viscosity of the (poly)borosiloxane | Boron content of the (poly)borosiloxane |
|---|---|---|---|---|---|
| 1 | $CH_3Si(OC_2H_5)_{0.8}O_{1.1}$ (1) | $B_2O_3$ | 120° C. | 85 mm²/s | 0.6% |
| 2 | $CH_3Si(OC_2H_5)_{0.8}O_{1.1}$ (1) | $B(OH)_3$ | 120° C. | 65 mm²/s | 0.4% |
| 3 | $CH_3Si(OCH_3)_{0.9}O_{2.1/2}$ (2) | $B_2O_3$ | 70° C. | 55 mm²/s | 0.5% |
| 4 | $CH_3Si(OCH_3)_{0.9}O_{2.1/2}$ (2) | $B(OH)_3$ | 70° C. | 60 mm²/s | 0.4% |
| 5 | $Si(OC_2H_5)_{2.2}O_{0.9}$ (3) | $B_2O_3$ | 100° C. | 5 mm²/s | 0.4% |
| 6 | $Si(OC_2H_5)_{2.2}O_{0.9}$ (3) | $B(OH)_3$ | 100° C. | 6 mm²/s | 0.3% |

(1) Viscosity: 25 mm²/s; commercially available under the tradename "Trasil" from Wacker-Chemie GmbH, Munich, Germany.
(2) Viscosity: 20 mm²/s; commercially available under the tradename "Silikat VP 2265" from Wacker-Chemie GmbH, Munich, Germany.
(3) Viscosity: 4 mm²/s; commercially available under the tradename "TES 40" from Wacker-Chemie GmbH, Munich, Germany.

(II) Preparation of the mixtures from components (B), (C), (D), (E) and (F)

The compounds listed in Table 2 are mixed in the proportions by weight specified therein, and the mixture is in each case treated with 50 parts of isopropanol and ground for 24 hours in a ball mill. The average particle size of the individual mixtures is 3 μm.

TABLE 2

| No. | (B) Parts of PbO | (C) Parts of $Na_2B_4O_7 \cdot 10H_2O$ | (C₂) Parts of $Na_2B_4O_7$ | (D) Parts of $Mg_3(Si_4O_{10})_2$ | (E) Parts of $Al_2O_3$ |
|---|---|---|---|---|---|
| a | 16.5 | 16.5 | 0 | 17 | 0 |
| b | 22 | 22 | 0 | 6 | 0 |
| c | 22 | 16 | 6 | 6 | 0 |
| d | 27 | 0 | 15 | 8 | 0 |
| e | 16 | 24 | 0 | 10 | 0 |
| f | 20 | 15 | 0 | 15 | 0 |
| g | 17 | 17 | 0 | 16 | 0 |
| h | 0 | 43 | 0 | 7 | 0 |
| i | 43 | 0 | 0 | 7 | 0 |
| j | 25 | 25 | 0 | 0 | 0 |
| k | 0 | 50 | 0 | 0 | 0 |
| l | 50 | 0 | 0 | 0 | 0 |
| m | 0 | 15 | 0 | 13 | 22 |
| n | 0 | 25 | 0 | 12 | 13 |
| o | 0 | 18 | 0 | 19 | 13 |

(III) Preparation of the coating compositions

In each case 100 parts of the polyborosiloxanes prepared in 1 to 6 described in Example 1,(I) above re in each case mixed with 150 parts of the mixtures (a) to (o) described in Example 1, (II) above and the resultant mixture is in each case subsequently diluted with isopropanol to such an extent that the run-out time according to DIN 53211 (DIN cup, 4 mm nozzle) is 12 to 14 seconds.

The coating compositions thus prepared are then sprayed onto

The coated substrates are subsequently introduced into a hot furnace at 1100° C. In all experiments a glass coating about 30 μm thick forms within a few seconds.

Regardless of the polyborosiloxane (A) and the substrate employed in each case,
high-gloss, smooth vitreous coatings which adhere strongly to the substrate are formed when mixtures a, b, c, d, e, f, g and j are employed. In some bubbles are entrapped, however, they do not impair the protective functions of the coatings;
high-gloss smooth, bubble-free vitreous coatings which adhere strongly to the substrate are formed when mixtures h, k, m, n and o are employed;
matt, somewhat rough vitreous coatings which adhere well to the substrate are formed when mixtures i and l are employed. In some bubbles are entrapped, however, they do not impair the protective functions of the coatings.

All specimens are then exposed for two hours to a temperature of 1100° C. in the presence of atmospheric oxygen. The hot specimens are then removed from the furnace and exposed at once to a temperature of 20° C. The heat-treated specimens show no obvious signs of damage. All the coatings have a very good resistance to changes in temperature.

EXAMPLE 2

The polyborosiloxanes 1 to 6 are prepared by the procedure described in Example 1, (I).

(II) Preparation of the mixtures from components (B), (C), (D) and (E)

The compounds listed in Example 1, Table 2 are mixed in the proportions by weight specified therein and the mixtures are ground for 12 hours in a ball mill. The average particle size of the individual mixtures is 5 μm.

(III) Preparation of the coating compositions

In each case 100 parts of the polyborosiloxanes 1 to 6 are in each case mixed with 100 parts of mixtures (a) to (o) described under (II).

The coating compositions obtained in this manner are then brushed onto
sheet steel,
graphite coated with a SiC coating prepared by a process according to German Application P 38 111 567.0 (W. Kalchauer, Wacker-chemie GmbH), and
CFC (carbon fiber-reinforced carbon) coated with a SiC coating prepared by a process according to German Application P 38 111 567.0 (W. Kalchauer, Wacker-Chemie GmbH)
and then introduced into a hot furnace at 1000° C. In all experiments a glass coating about 80 μm thick forms within a few seconds.

Regardless of the polyborosiloxane (A) and the substrate employed in each case,
high-gloss, smooth vitreous coatings which adhere strongly to the substrate are formed when mixtures a, b, c, d, e, f, g and j are employed. In some bubbles are entrapped, however, they do not impair the protective functions of the coatings;
high-gloss, smooth, bubble-free vitreous coatings which adhere strongly to the substrate are formed when mixtures h, k, m, n and o are employed;
matt, somewhat rough vitreous coatings which adhere well to the substrate are formed when mixtures i and l are employed. In some bubbles are entrapped, however, they do not impair the protective functions of the coatings. All specimens are then exposed for one hour to a temperature of 1000° C. in the presence of atmospheric oxygen. The hot specimens are then removed from the furnace and exposed at once to a temperature of 20° C. The heat-treated specimens show no obvious signs of damage. All the coatings exhibit very good resistance to changes in temperature.

What is claimed is:

1. A process for preparing a vitreous coating on a substrate which comprises applying to a substrate a composition comprising
    (A) a polyborosiloxane,
    (B) 0 to 90 percent by weight of a lead compound, selected from the group consisting of lead oxides and lead compounds which form lead oxides at temperatures up to 1500° C. in the presence of atmospheric oxygen,
    (C) 0 to 90 percent by weight of a boron compound, selected from the group consisting of boron oxides and boron compounds which form boron oxides at temperature up to 1500° C. in the presence of atmospheric oxygen, except for the polyborosiloxane,
    (D) 0 to 50 percent by weight of talc,
    (E) 0 to 90 percent by weight of an aluminum compound, selected from the group consisting of aluminum oxides at temperatures up to 1500° C. in the presence of atmospheric oxygen, and
    (F) 0 to 600 percent by weight of a solvent, based on the weight of the polyborosiloxane (A),
with the proviso that the coating composition contains at least one of the components (B), (C), (D) and (E) in an amount such that the total weight is at least 20 percent by weight, based on the weight of the polyborosiloxane (A), and thereafter heating the coated substrate to a temperature of at least 500° C. to form a vitreous coating thereon.

2. The process of claim 1, wherein the polyborosiloxane (A) is obtained from the reaction of an organo(poly)siloxane having units of the general formula $$R_a Si(OR^1)_b O_{\frac{4-a-b}{2}}$$

in which R is selected from the group consisting of substituted hydrocarbon radicals and unsubstituted hydrocarbon radicals, $R^1$ is selected from the group consisting of aliphatic hydrocarbon radicals and hydrogen, with the proviso that at most 5 percent by weight, based on the weight of the organo(poly)siloxane used, of Si-bonded hydroxyl groups are present, a is 0, 1, 2 or 3, b is 0, 1, 2, or 3, with an average of from 0.1 to 2.5, and the sum of a and b is an average of from 1 to 2.8, and at least one boron compound, selected from the group consisting of boric acid, boric anhydride, metal borate, boric acid ester and born halide.

3. The process of claim 1, wherein the composition contains at least two of the components (B), (C), (D) and (E) in an amount such that the total weight is at least 20 percent by weight, based on the weight of polyborosiloxane (A).

4. The process of claim 2, wherein the composition contains at least two of the components (B), (C), (D) and (E) in an amount such that the total weight is at least 20 percent by weight, based on the weight of polyborosiloxane (A).

5. The process of claim 1, wherein the composition contains at least three of the components (B), (C), (D) and (E) in an amount such that the total weight is at least 20 percent by weight, based on the weight of polyborosiloxane (A).

6. The process of claim 2, wherein the composition contains at least three of the components (B), (C), (D) and (E) in an amount such that the total weight is at least 20 percent by weight, based on the weight of polyborosiloxane (A).

7. The process of claim 1, wherein the substrate to be protected consists of at least one material selected from the group consisting of metals, carbonaceous substances and ceramic materials.

8. The process of claim 1, wherein the heat treatment is carried out at a pressure between 900 and 1110 hPa in the pressure of air.

9. The process of claim 7, wherein the heat treatment is carried out at a pressure between 900 and 1100 hPa in the presence of air.

10. The process of claim 1, wherein the heat treatment is carried out at a temperature from 500 to 1500° C.

11. The process of claim 7, wherein the heat treatment is carried out at a temperature from 500 to 1500° C.

12. The process of claim 8, wherein the heat treatment is carried out at a temperature from 500 to 1500° C.

13. The process of claim 1, wherein the composition also contains additional components selected from the group consisting of pigments, fillers and mixtures thereof.

* * * * *

UNITED STATES PATENT AND TRADEMARK OFFICE
CERTIFICATE OF CORRECTION

PATENT NO. : 5,098,747

DATED : March 24, 1992

INVENTOR(S) : Dr. Wilfried Kalchauer, Dr. Bernd Pachaly and Dr. Werner Graf

It is certified that error appears in the above-identified patent and that said Letters Patent is hereby corrected as shown below:

Column 9, line 59, after "aluminum oxides" add "and aluminum compounds which form aluminum oxides".

Column 10, line 50, delete "pressure of air" and insert "presence of air".

Signed and Sealed this

Twenty-ninth Day of June, 1993

Attest:

MICHAEL K. KIRK

*Attesting Officer*   *Acting Commissioner of Patents and Trademarks*